United States Patent
Chen et al.

(10) Patent No.: US 6,625,212 B1
(45) Date of Patent: Sep. 23, 2003

(54) PIXEL PADDING PROCEDURE USING SIMD OPERATIONS OR VECTOR PROCESSING

(75) Inventors: Yen-Kuang Chen, Franklin Park, NJ (US); Nicholas H. Yu, Wexford, PA (US)

(73) Assignee: Intel Corporation, Santa Clara, CA (US)

( * ) Notice: Subject to any disclaimer, the term of this patent is extended or adjusted under 35 U.S.C. 154(b) by 642 days.

(21) Appl. No.: 09/608,416

(22) Filed: Jun. 30, 2000

(51) Int. Cl.[7] .............................. H04B 1/66; H04N 7/26
(52) U.S. Cl. .................................. 375/240.08; 382/243
(58) Field of Search ........................ 375/240.01, 240.02, 375/240.08, 240.12; 382/243; H04B 1/66; H04N 7/26

(56) References Cited

U.S. PATENT DOCUMENTS

| | | | | |
|---|---|---|---|---|
| 5,990,956 A | * | 11/1999 | Lee | 348/404 |
| 6,058,213 A | * | 5/2000 | Cho | 382/239 |
| 6,078,694 A | * | 6/2000 | Takahashi et al. | 382/238 |
| 6,125,142 A | * | 9/2000 | Han | 375/240.1 |

* cited by examiner

Primary Examiner—Howard Britton
(74) Attorney, Agent, or Firm—Blakely, Sokoloff, Taylor & Zafman LLP (57) ABSTRACT

A pixel padding procedure is disclosed. The padding procedure provides a method for filling pixels in a block in accordance with intensities of pixels in preceding and succeeding pixels of the same row or column. This padding procedure may include filling pixels with simultaneous logic operations; transposing blocks before and after horizontal padding; case detecting for simple or complex padding; simple pixel filling, where no pixels need to be averaged; and complex pixel filling, which contains pixels to be averaged. In one embodiment, this procedure may be performed in an MMX™ implementation for MPEG-4 repetitive padding.

30 Claims, 8 Drawing Sheets

PIXEL PADDING PROCEDURE USING SIMD OPERATIONS OR VECTOR PROCESSING

FIELD OF INVENTION

The invention relates generally to video processing, and in particular, to padding a video image.

BACKGROUND OF THE INVENTION

With the development of digital video signal recording technology, it is expected that digital video signal reproduction devices will have improved image quality. Typical encoding schemes, such as those developed by MPEG (Motion Picture Coding Experts Group), generally operate to highly compress video information to facilitate its transmission over channels of very limited bandwidth. According to systems that operate using the MPEG standards, video and audio data are compressed and recorded on a storage device in a time-division-multiplexed format.

The MPEG-4 video coding standard supports arbitrarily shaped video objects in addition to the conventional frame-based functionality in MPEG-1 and MPEG-2. Thus, in MPEG-4, the video input is no longer considered as a rectangular region.

However, the MPEG-4 video coding scheme processes the successive images of a video object plane (VOP) sequence in a block-based manner (e.g., using motion estimation, motion compensation, discrete cosine transform (DCT), or inverse discrete cosine transform (IDCT)). Therefore, before motion estimation, motion compensation, or DCT can be performed, the non-object pixels of contour macroblocks, which contain the shape edge of an object, must be filled.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A pixel padding procedure is disclosed. The padding procedure provides a method for filling pixels in a block in accordance with intensities of pixels in preceding and succeeding pixels of the same row or column. The procedure may perform padding using single-instruction-multiple-data (SIMD) operations or vector processing, such as, for example, Intel Architecture MMX technology operations (MMX is a trademark of Intel Corporation, Santa Clara, Calif.), streaming SIMD extensions, very large instruction word (VLIW) operations, or explicitly parallel instruction computing (EPIC) operations.

This padding procedure includes several alternative techniques, such as, for example, filling pixels with simultaneous logic operations; transposing blocks before and after horizontal padding; case detecting for simple or complex padding; simple pixel filling, where no pixels need to be averaged; and complex pixel filling, which contains pixels to be averaged. In one embodiment, this procedure may be performed in an MMX™ implementation for MPEG-4 repetitive padding.

Figure 1:
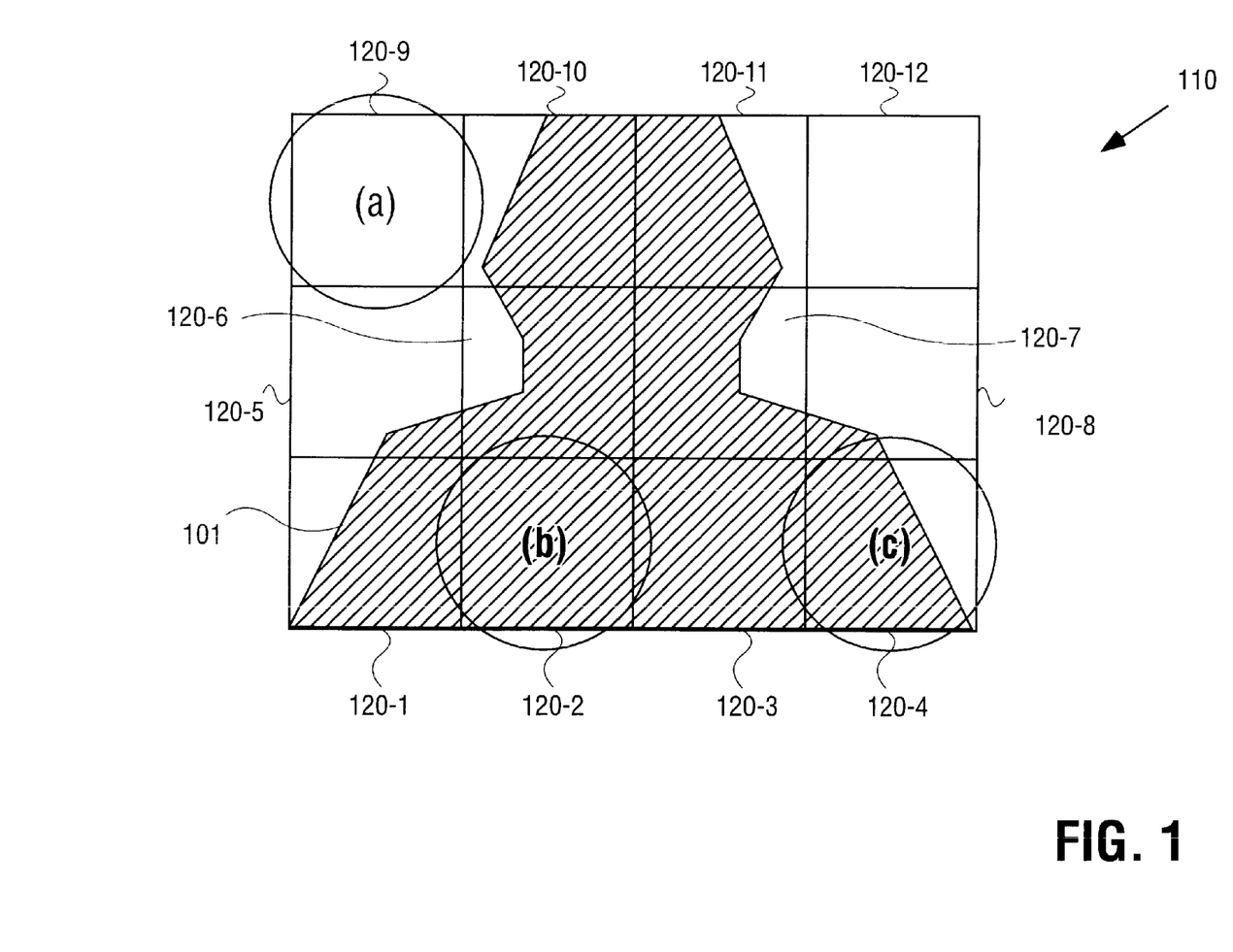
FIG. 1 is a bounding box and macroblocks of an arbitrary shaped video object.

Macroblock-based methods are used to encode and display arbitrarily shaped video objects. Padding methods are used to support the macroblock-based methods. FIG. 1 shows an example of a video object that is encoded and displayed using macroblocks and padding. A minimum sized rectangular bounding box 110 is defined for each arbitrary shaped object 101. The bounding box 110 is subdivided to include an array of macroblocks 120-n with a natural number of macroblocks in the horizontal and vertical directions.

Because of the arbitrary shape of the object, not all pixels inside the bounding box 110 contain valid object pixel values. For example, there are macroblocks that lie completely inside the object (e.g. 120-2, 120-3), macroblocks that lie completely outside of the object (e.g. 120-9, 120-12), and macroblocks that cover the border of the video object (e.g. 120-1, 120-4, 120-5, 120-6, 120-7, 120-8, 120-10, 120-11), as shown in FIG. 1. Macroblocks that lie inside the object remain untouched. Macroblocks that cover the object border, or mask, are filled using a repetitive padding method.

The repetitive padding method that is used depends on the shape of the object inside a given macroblock. The padding method is used to fill the non-object pixel positions of luminance macroblocks as well as chrominace blocks or macroblocks, with valid values. The repetitive padding can be separated into two steps: the horizontal and the vertical padding.

Padding is accomplished by copying outwards the pixels that lay on the edge of the mask. First, the pixels are padded in the horizontal direction, with boundary pixels propagated both leftwards and rightwards. In a second pass, pixels are padded in the vertical direction. In both cases, if a pixel that lies outside of the mask is bounded by two masked pixels on opposite sides, the unmasked pixel should be assigned the average of both bounding pixels.

Figure 2A:
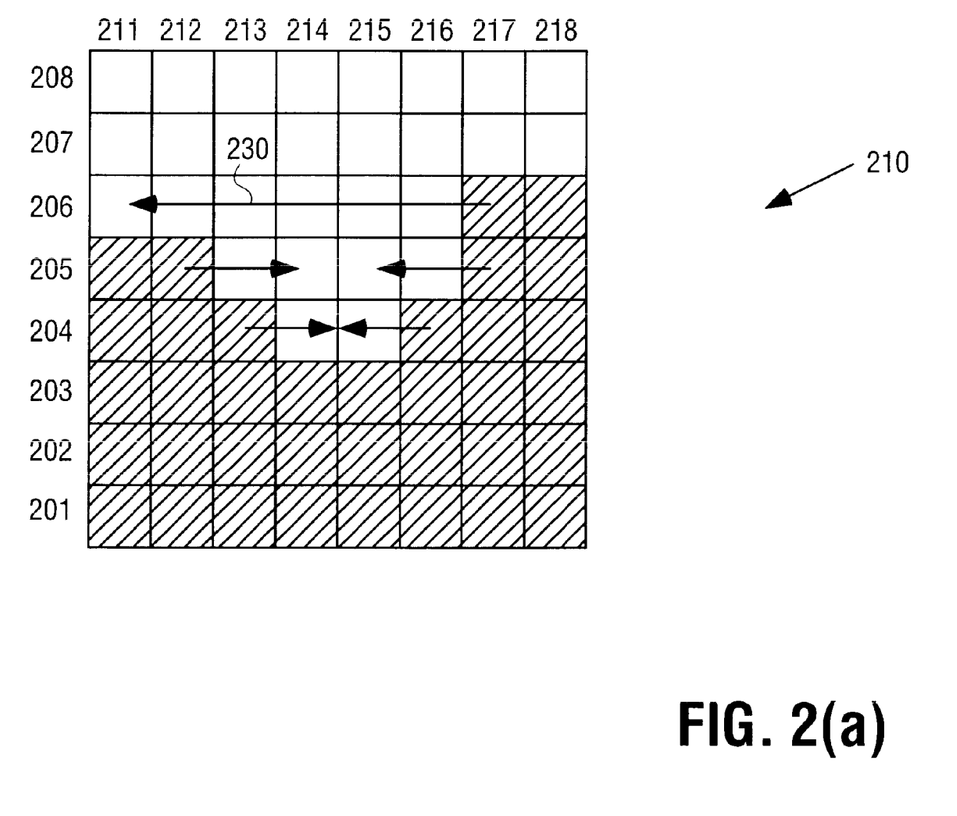
FIGS. 2A and 2B are examples of block padding.
Figure 2B:
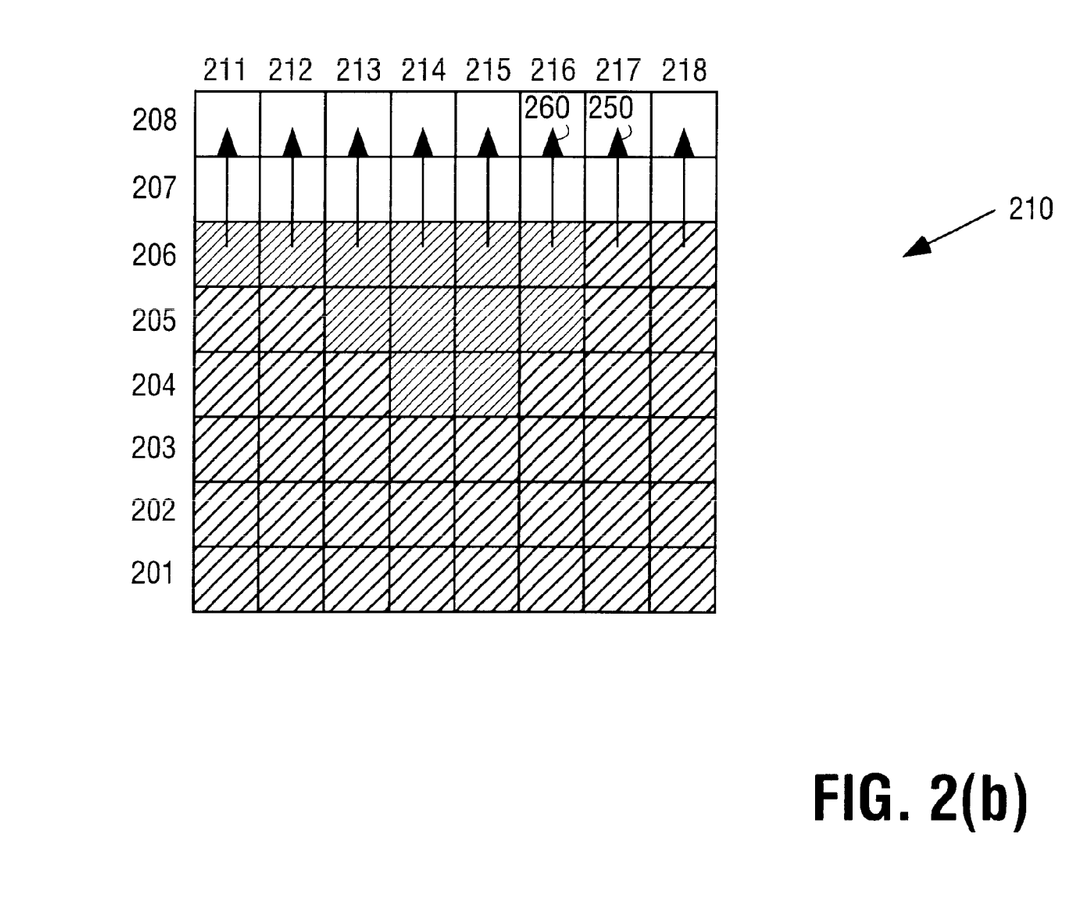

In the horizontal padding step, the macroblock is processed row by row, as shown in FIG. 2(a). In FIG. 2(a), the pixels of the video object are shaded, and the pixels outside of the object, the non-object pixels, are unshaded. The non-object pixels in each row, 201 through 208, of the macroblock 210 are filled with the border value of the object for that row. For example, the pixels in row 206 take the value of the object pixel in row 206, column 217, as indicated by arrow 230, and as shown in FIG. 2(b). The object pixels form a mask, thus the non-object pixels are unmasked.

If a non-object pixel has object border pixels on both sides, the average of the border values is taken, and this average value is used to fill in the non-object pixel. For example, in row 205 of FIG. 2(b), the pixels in columns 213 through 216 are in between object pixels in columns 212 and 217. The average of the pixel values of row 205, columns 212 and 217 is used to pad the pixels in row 205, columns 213 through 216. A similar method is used to pad the non-object pixels in row 204. After the horizontal padding is finished, the padded pixel positions are marked as object pixels for the vertical padding method.

In the vertical padding method, the macroblock is processed column by column, as shown in FIG. 2(b). The non-object pixels in each column are filled with the value of the border object pixel in that column. For example, the value of the border pixel in column 217, row 206 of FIG. 2(*b*) is used for the value of the non-object pixels of that column, as indicated by arrow 250.

In the vertical padding method, the non-object pixels may be padded with padded pixel values of pixels that were padded in the horizontal padding method. For example, the border value of column 216 is the value of the pixel in row 206 of this column, which is a padded value generated during the horizontal padding. The value of each non-object pixel of this column becomes the value of the padded pixel in row 206, column 216, as indicated by arrow 260. If there are object border pixels on both sides of a non-object pixel, the average of these border values is taken and used to pad the non-object pixels.

Table 1 shows an example of pseudo-code for the vertical pixel padding method, where x and y are the horizontal and vertical coordinates of a pixel, y' is the location of the nearest valid sample (s'[y'][x]==1) above the current location y at the boundary of hv_pad, y" is the location of the nearest boundary sample below y, and M is the number of samples of a column in a macroblock. However, other alternatives could be used without departing from the scope of the invention.

TABLE 1

```
For (y=0; y<M; y++)
{
    If (s'[y][x] == 1)
        hv_pad[y][x] =hor_pad [y][x];
    Else
    {
        If (s'[y'][x] == 1 && s'[y"][x] == 1)
            hv_pad [y][x] =
                (hor_pad[y'][x] + hor_pad[y"][x])//2;
        Else if (s'[y'][x] == 1)
            hv_pad[y][x] = hor_pad[y'][x];
        Else if (s'[y"][x] == 1)
            hv_pad [y][x] = hor_pad[y"][x];
    }
}
```

Figure 3A:
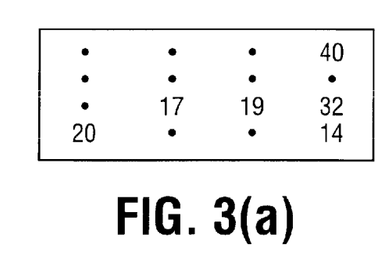
FIGS. 3(a), 3(b), and 3(c) are numerical examples of block padding.
Figure 3B:
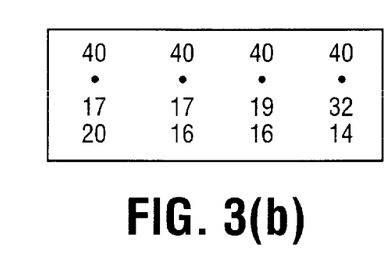
Figure 3C:
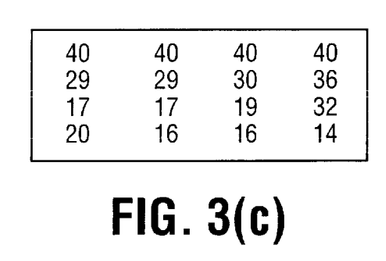

FIGS. 3(*a*), 3(*b*) and 3(*c*) show a numerical example of pixel padding. FIG. 3(*a*) shows an original 4×4 matrix of an object. Pixel positions labeled with an asterix are outside of the pixel mask. FIG. 3(*b*) shows the matrix and the pixel values after the horizontal padding stage. Pixels in bold are the changed, or padded, values. FIG. 3(*c*) shows the final matrix after the vertical padding stage.

Horizontal padding is done before vertical padding. However, horizontal padding can be much harder to implement efficiently using a system in which contiguous bytes in memory are in the same row, not the same column, such as a system that implements MMX instructions, for example. Therefore, in one embodiment, the macroblock is transposed before horizontal padding is performed, as shown in FIG. 4.

Figure 4:
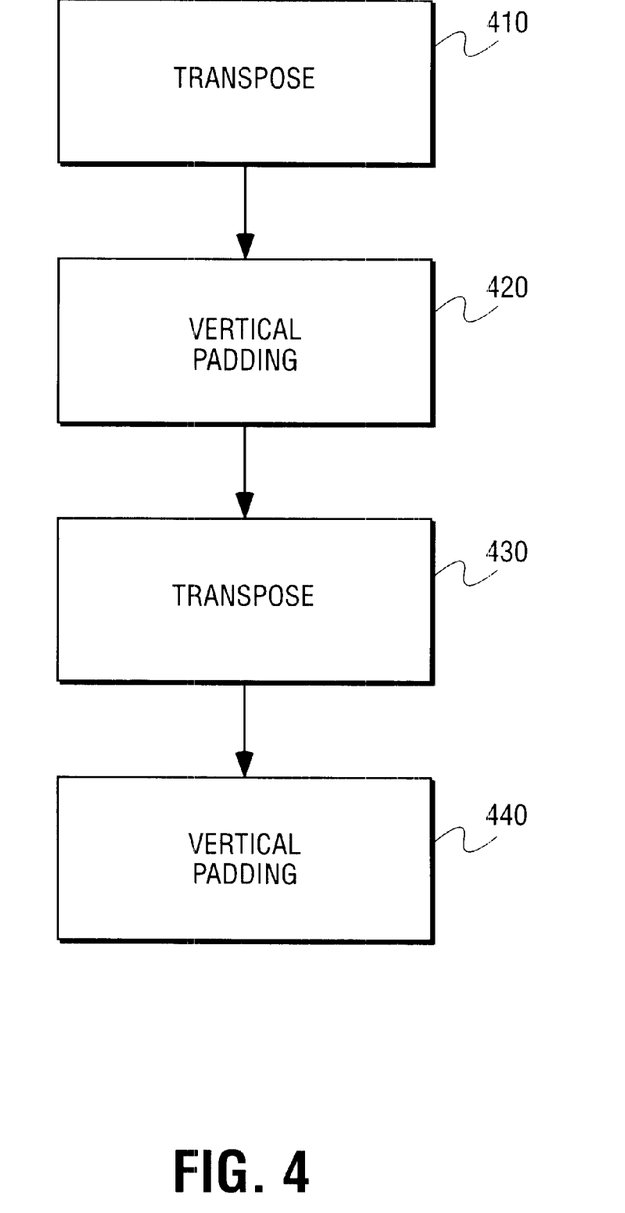
FIG. 4 is an embodiment of a method for padding.
Figure 5A:
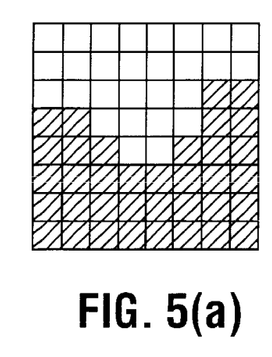
FIGS. 5(a), 5(b), 5(c), 5(d), and 5(e) are embodiments of a block padded using the method of FIG. 4.
Figure 5B:
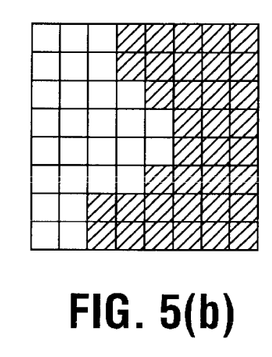
Figure 5C:
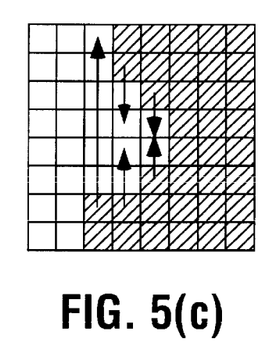
Figure 5D:
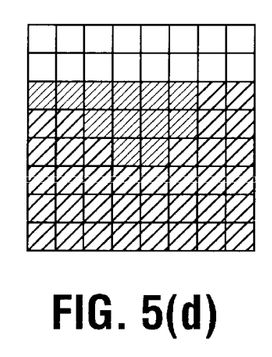
Figure 5E:
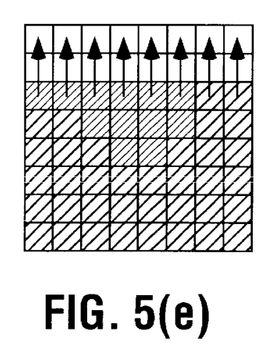

FIG. 4 shows an example of one embodiment of a pixel padding procedure containing four parts: (1) a transpose of the block 410, (2) vertical padding 420, (3) a transpose of the block 430, and (4) vertical padding 440. After the block is transposed, step 410, the block is padded in the vertical direction, step 420. This transposing then padding provides the same result as padding in the horizontal direction, but is more efficient to implement using software instructions. The block is then transposed again, step 430, and padded in the vertical direction, step 440. Thus, by transposing the block twice, only vertical padding needs to be performed. The horizontal padding, which requires more complex instructions, is eliminated.

FIGS. 5(*a*) through 5(*e*) show a graphical example of a macroblock that is padded using the method shown in FIG. 4. FIG. 5(*a*) shows the original unpadded block, where the shaded pixels are object pixels, and the unshaded pixels are non-object pixels. FIG. 5(*b*) shows a transpose of the original block. FIG. 5(*c*) shows the macroblock being padded vertically. FIG. 5(*d*) shows a second transpose of the vertically-padded transposed block. The block shown in FIG. 5(*d*) shows that the results of transposing and vertically padding the block are equivalent to horizontally padding the block. FIG. 5(*e*) shows a second vertical padding of the block.

FIGS. 4 and 5(*a*) through 5(*e*) show that including two transposes of the block enables the padding process to use only vertical pixel padding. The vertical padding can be reduced to two specific cases, which depend only on the shape of the block, and not the pixel values.

The first case is complex fills, which contain pixels which need to be averaged. This case is true if and only if there exists some i, j, a>j, b<j such that M(i, j)=0, M(i, a)!=0, M(i, b)!=0, for a vertical pad.

The second case is simple fills, where no pixels need to be averaged. That is, this set includes all cases that are not complex. Case two can be solved in significantly less time than case one. Before a block is processed, it is beneficial to perform a test in order to deduce which case it belongs to. This test can be done quickly by using only simple packed exclusive-or (XOR) and add (ADD) instructions.

In order to test a block, a row of unmasked pixels is inserted to the top of the block. For example, if a block is 8×8, with 8 rows and 8 columns of pixels, an additional row of unmasked pixels changes the block to a 9×8 block. The resulting 9×8 block is simple if and only if there exists no more than two sets of adjacent pixels in the same column with different mask values. An exemplary proof is as follows:

The number of differing mask values in a given column are counted. If the number is two or less, then there is one large region of masked pixels in this column that can be padded in both directions without any averaging. The first differing mask value from the top is the top of this large region, and the second differing mask value is the bottom of this region. A third differing mask value cannot be introduced anywhere because it would necessitate another region of masked pixels in this column outside and nonadjacent to the original region. Although a region may only add one to the count of differing mask values if it borders the bottom of the matrix, at most one region can do this. This still leaves the other region with two differing mask values.

The XOR of two adjacent mask values will equal one if they differ. Every value can be XORed with its upper neighbor, and the results accumulated in a separate register. At the end, if any column accumulator is greater than two, than the block is not simple.

In one embodiment, this test can be executed efficiently using MMX™ instructions. For example, if a block is an 8×8 block, then 8 XORs and 8 ADDS can be computed at once using the packed exclusive-or (PXOR) and packed add (PADD) instructions. The values are unpacked into the integer register before comparing them and branching to either the simple or complex padding instructions. Every column does not have to be tested individually, however. The packed-compare-greater-than-byte (PCMPGTB) instruction can be used to compare every byte in the register to 0x02. Those that are greater than two can be set to the value of 0xFF and the rest can be cleared to 0x00. These values can then be unpacked into two integer registers. A value of 0x00000000 in the 32-bit register would indicate that none of the four accumulators had values greater than two.

In one embodiment, the comparison method may use 3 compares, 2 unpacks, and 2 conditional jumps for 8 columns, as shown in Appendix A.

Once it has been determined that a block only needs a simple fill for padding because there are no pixels that need averaging, the block can be padded using a simple two pass vertical padding method. The first pass moves from top to bottom, copying pixels downwards into unmasked pixels. The second pass moves from bottom to top, copying upwards.

Table 2 shows the pseudo-code for padding in the simple case. Given two pixels P1 and P2, their masks M1 and M2, where P1 is to be copied into P2, and P2=0 if P2 is not in the mask, the padding can be performed by:

TABLE 2

P2 = P2 + [P1 AND (NOT M2)]
M2 = M1 OR M2

This method can be sped-up using MMX™ instructions. For example, if a block is an 8×8 block, then the method may compute all eight pixels in a row concurrently. This can be done because this method can be executed without any knowledge of the pixel or mask values—there are no branch statements. Appendix B shows an example of code for padding the simple case.

The complex case, where some pixels must be averaged, is slightly more complicated. Extra work must be done in order to average a select few pixel values in a 64-bit register while not affecting other values.

This problem can be solved by using a similar two-pass method, but including two masks instead of one. The first mask is formed by the object pixels. The second mask is formed during the first pass, and is used to determine whether a value for a padded pixel needs to be averaged. In the first pass, any pixels that have been changed, or padded, are marked in the second mask. All other pixels in the second mask are left unmarked. In the second pass, the pixels that have been marked in the second mask are averaged.

Only those pixels that lie in a strip of pixels that have been changed and are surrounded on the top and bottom by pixels that have not been changed need to be averaged. Therefore, on the second pass, starting from the bottom, moving up, if there are two pixels adjacent in the same column, one that has been padded, and one that has not been padded, the padded pixel needs to be averaged. All eight pixels can be averaged in one instruction and the pixels that do not need to be changed are masked off. These are added to the pixel values to be copied upwards, which have the pixel values that need to be averaged masked off. Finally, the changed mask for the row is inverted, to allow the next row of pixels to be averaged. (Only pixels that have differing "changed mask" values are averaged).

However, regions of pixels that have more than one pixel in a row that need to be averaged are not correctly computed. This is because the first pixel from the bottom will have the average of the top and bottom bounding pixels correctly computed, but the second pixel will be the average of the top bound and the last average. Therefore, a mask of the pixels which have been averaged last, and their computed values, is stored. When the new averages are computed, the pixels that were averaged last are masked out and replaced with the correct, computed average of the last row.

Table 3 shows exemplary pseudo-code for padding in the complex case. Given two pixels P1 and P2, their masks M1 and M2, and the secondary masks Q1 and Q2, where P1 is to be copied into P2, and where to_average, avg1, and avg2, last_avg=0, lastavgmask=0, are variables, the padding can be performed by:

TABLE 3

Pass 1

P2 = P2 + [P1 AND (NOT M2)]
Q2 = M1 AND (NOT M2)
M2 = M1 OR M2

Pass 2 to_average = (NOT Q1) AND Q2
avg1 = to_average AND [AVERAGE (P1, P2)]
avg2 = [avg1 AND (NOT last avg_mask)] + last_avg
P2 = P2 + {[P1 AND (NOT M2)] AND (NOT to_average)} + avg2
avg_mask = to_average
last_avg = avg2
Q1 = NOT Q1

Figure 6:
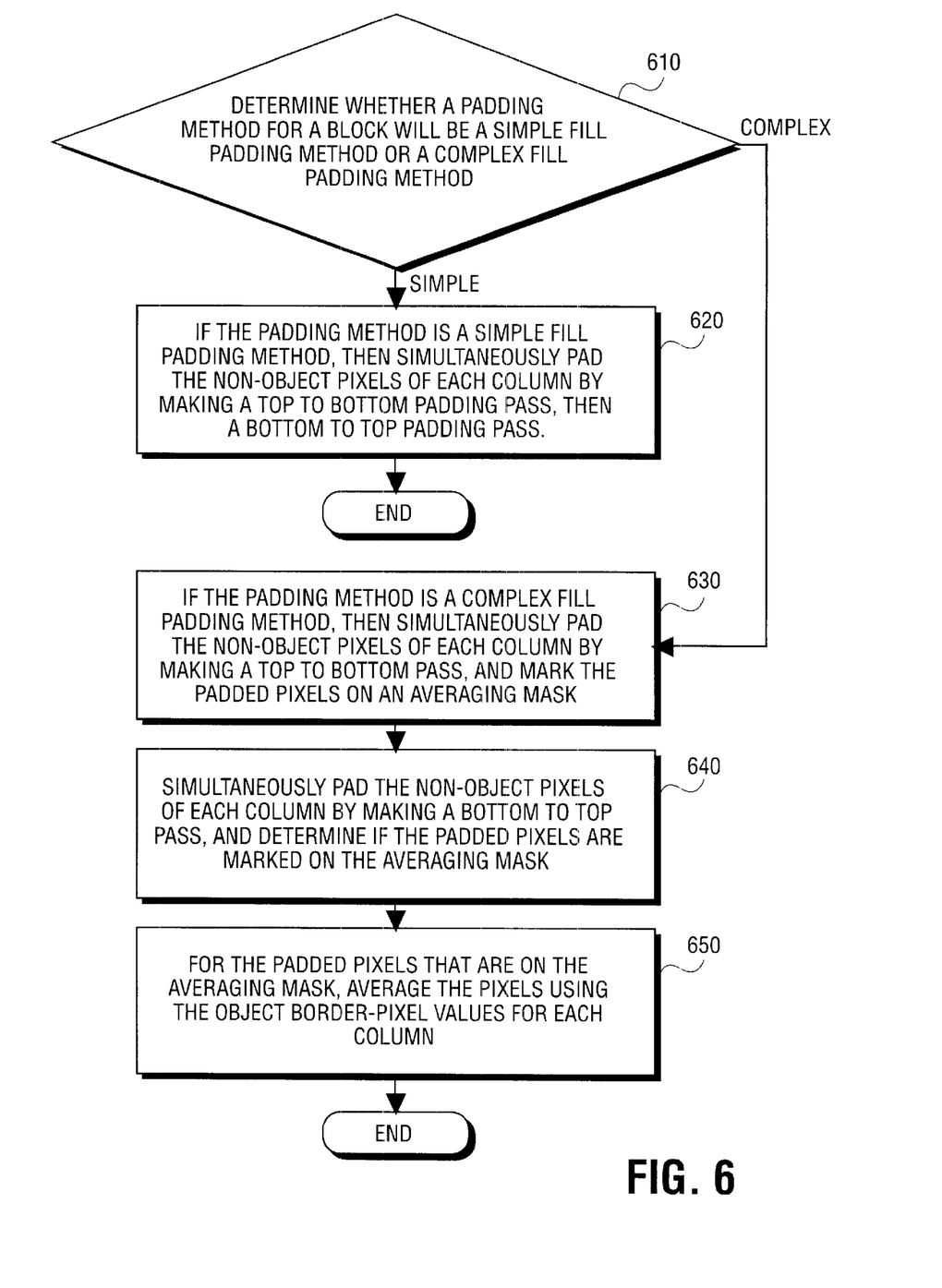
FIG. 6 is another embodiment of a padding method.

FIG. 6 shows an embodiment of padding using the simple and complex fill methods. First, a test is performed to determine whether a padding method for a block will be a simple fill padding method or a complex fill padding method, step 610. If the padding method is a simple fill padding method, then the non-object pixels of each column are simultaneously padded by making a top to bottom pass, then a bottom to top pass, step 620. If the padding method is a complex fill padding method, then the non-object pixels of each column are simultaneously padded by making a top to bottom pass, and the padded pixels are marked on an averaging mask, step 630. Then, the non-object pixels of each column are simultaneously padded by making a bottom to top pass, and the method determines whether the pixels padded on this second pass are marked on the averaging mask, step 640. For the padded pixels marked on the mask, each marked pixel takes the value of the average of the object border-pixels for the corresponding column of the marked pixel, step 650.

Figure 7:
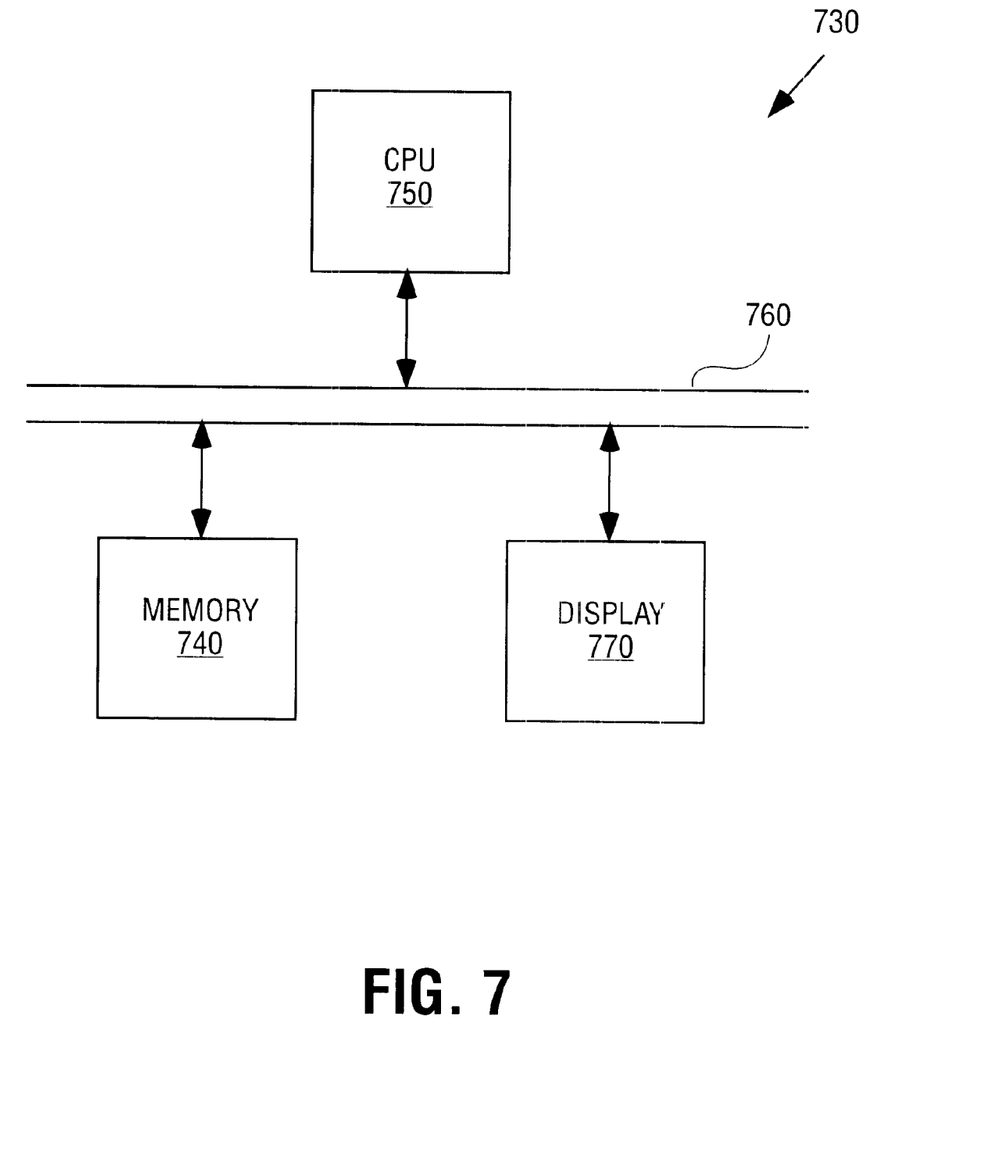
FIG. 7 is an embodiment of an apparatus that performs the padding method.

FIG. 7 shows an embodiment a device 730 that implements the methods discussed above. Computer readable memory 740 stores computer software instructions which, when executed by central processing unit (CPU) 750, performs at least one of the methods for padding a macroblock. The CPU 750 can read and execute the stored software instructions from memory 740 through data bus 760. The video object is stored in memory 740 and displayed by device 730 on video display monitor 770. The non-object pixels of the object are padded as discussed above.

The padding procedure may be used in MPEG-4-related applications, such as low-bit-rate Internet-based communications, or high-bit-rate video broadcasting. The padding procedure may be described with reference to the Intel architecture and the related instruction set. However, the same techniques can be applied to other processor architectures and instruction sets. For example, the padding procedure can fill pixels using simultaneous logic operations. In various embodiments, the padding procedure can perform the simultaneous logic operations in each processor cycle (for example, SIMD operations, vector processing, MMX™, streaming SIMD extensions, VLIW, or EPIC).

These and other embodiments of the present invention may be realized in accordance with the teachings described herein and it should be evident that various modifications and changes may be made to these teachings without departing from the broader spirit and scope of the invention. The specification and drawings are, accordingly, to be regarded in an illustrative rather than restrictive sense and the invention measured only in terms of the claims.

---

Appendix A. An exemplary embodiment of code for a comparison method

```
mov esi, transposedmaskptr
pxor mm7, mm7                ; mm7 ← 0
movq mm6, ones               ; mm6 ← 0x01010101
add esi, 8
pxor mm0, mm0                ; mm0 ← 0
mov ecx, 4
checksimple:
movq mm1, [esi]              ; mm1 ← line 1 (or 5)
movq mm2, [esi+16]           ; mm2 ← line 2 (or 6)
movq mm3, [esi+32]           ; mm3 ← line 3 (or 7)
pxor mm0, mm1                ; find the xor of successive lines
pxor mm1, mm2
pxor mm2, mm3
pand mm0, mm6                ; accumulate the columns which
change
pand mm1, mm6                ; (xor! = 0)
pand mm2, mm6
paddb mm7, mm0               ; mm7 ← accumulate change counts
movq mm0, [esi+48]           ; mm0 ← line 4 (or 8)
paddb mm7, mm1
paddb mm7, mm2
pxor mm3, mm0
pand mm3, mm6
paddb mm7, mm3
add esi, 64
loop checksimple
movq mm1, twos               ; mm1 ← 0x02020202
                             see if any byte column has a value
pcmpgtb mm7, mm1             ; greater than 2
movd ecx, mm7
psrlq mm7, 32
movd edx, mm7
cmp ecx, 0
jne isnotsimplehoriz
cmp edx, 0
jne isnotsimplehoriz
```

Appendix B. An exemplary embodiment of code for a procedure to perform simple pixel padding.

```
Twopassfillsimple:
  mov Edi, transposedpixelsptr
  mov Esi, transposedmaskptr
  mov Ecx, 7                 ; loop counter
Passloop1simple:
  movq mm1, [esi+8]          : mm1 ← M2
  movq mm0, [edi+8]          ; mm0 ← P2
  movq mm5, mm1              ; mm5 ← M2
  pandn mm1, [edi]           ; mm1 ← P1 AND (NOT M2)
                             ; do bitwise not of the mask of the
                             ; current line, and it with the pixels
                             ; of the last line
  por mm0, mm1               ; mm0 ← P2 + [P1 AND (NOT M2)]
                             ; and add them together. this "smears"
                             ; the pixels in the down direction.
  por mm5, [esi]             ; mm5 ← M2 + M1
                             ; change the mask
  movq [edi+8], mm0
  movq [esi+8], mm5
  add esi, 8
  add edi, 8
loop passloop1simple
mov ecx, 7                   ; loop counter
sub esi, 8
sub esi, 8
passloop2simple:
  movq mm1, [esi]            ; this does the same thing but in
  movq mm0, [edi]            ; reverse this time
```

---

```
  mov mm5, mm1
  pandn mm1, [edi+8]
  por mm0, mm1
  por mm5, [esi+8]           ; the new mask! all pixels which are
  movq [edi], mm0            ; in either row
movq [esi], mm5
sub esi, 8
sub edi, 8
loop passloop2simple
```

Appendix C. An exemplary embodiment of code for a procedure to perform complex pixel padding.

```
isnotsimplehoriz
  mov ecx, 7
  mov edi, transposedpixelsptr
  mov esi, transposedmaskptr
  mov edx, maskaverageptr
passloop1complex:
  movq mm1, [esi+8]          ; mm1 ← M2
  movq [edi+8]               : mm0 ← P2
  movq mm5,mm1;              ; mm5 ← M2
  movq mm6,mm1;              ; mm6 ← M2
  pandn mm1, [edi]           ; mm1 ← P1 AND (NOT M2)
  por mm0, mm1               ; mm0 ← P2 + [P1 AND (NOT M2)]
  movq mm2,[esi]             ; mm2 ← M1
  pandn mm6, mm2             ; mm6 ← M1 AND (NOT M2)
  por mm5, mm2               ; mm5 ← M1 + M2
  movq [edi+8], mm0
  movq [esi+8], mm5
  movq [edx+8], mm6          ; here, pixels which have been
changed
                             ; are stored in this array, used for
                             ; averaging in the second pass
add esi, 8
add edi, 8
add edx, 8
loop passloop1complex
mov ecx, 7
sub esi, 8
sub edi, 8
sub edx, 8
pxor mm7, mm7                ; register that has the last average
                             ; values
                             ; register that is a mask of not
pcmpeqd mm3, mm3             ; averaged pixels
                             mm7 = 0, mm3 = 0xFFFFFFFF to start
passloop2complex:
  movq mm1, [esi]            ; mm1 ← M1
  movq mm0, [edi]            : mm0 ← P1
  movq mm2, [edx+8]          ; get pixels in the previous row which
                             ; have been changed in the first pass
  movq mm5, mm1              ; mm5 ← M1
  pandn mm1, [edi+8]         ; mm1 ← P2 AND (NOT M1)
  pandn mm2, [edx]           ; mask only pixels which have changed
                             ; in this row, and not in the previous
                             ; mm2 ← Q1 AND (NOT Q2)
  por mm5, [esi+8]           ; the new mask; mm5 ← M1 + M2
  movq mm4, mm2              ; save this for later. mm4/mm6 is now
                             ; a mask for pixels which need to be
                             ; averaged. (1)
  pand mm2, mm0              ; get the pixel values
                             ; mm2 ← P1 + Q1 AND (NOT Q2)
  movq [esi], mm5
  por mm0, mm1               ; copy pixels to next row
                             ; mm0 ← P1 + P2 AND (NOT M1)
  movq mm6, mm4              get the original mask (1)
                             'mm6 ← Q1 AND (NOT 02)
  panda mm4, mm0             ; mm4 ← [P1 + P2 AND (NOT M1)]
                             AND
                             {NOT [Q1 AND (NOT Q2)]1}
  movq mm0, mm4
  movq mm4, mm6
  pand mm4, [edi+8]          ; and get pixels that need to be
                             ; averaged from the previous line
  pxor mm5 , mm5
  pxor mm1, mm1
  punpcklbw mm1, mm2         ; average the pixels
  punpcklbw mm5, mm4
  psrlq mm1, 8
```

-continued

```
psrlq mm5, 8
paddw mm1, mm5
paddw mm1, oneword
psrlw mm1, 1
packuswb mm1, mm5
movd eax, mm1
pxor mm5, mm5
pxor mm1, mm1
punpckhbw mm1, mm2
punpckhbw mm5, mm4
psrlq mm1, 8
psrlq mm5, 8
paddw mm1, mm5
paddw mm1, oneword
psrlw mm1, 1
packuswb mm1, mm5
psllq mm1, 32
movd mm4, eax
paddb mm4, mm1
pand mm4, mm3         ; mask out pixels that were averaged
                      ; last (we don't want to average the
                      ; same column twice)
paddb mm4, mm7        ; add in last values
paddb mm4, mm6
paddb mm0, mm4        ; add them to the current line's pixels
movq mm7, mm4
movq mm3, mm6
pandn mm6, [edx]      ; reverse the "changed" mask for this
                      ; line
pcmpeqd mm1, mm1
pandn mm3, mm1
movq [edi], mm0       ; update and copy everything
movq [edi], mm6
sub esi, 8
sub edi, 8
sub edx, 8
dec Ecx
jnz Passloop2complex
```

What is claimed is:

1. A method comprising:
testing a block having a plurality of pixels, including object pixels and non-object pixels, by
inserting a row of non-object pixels on a vertical boundary of the block; and
determining whether the block requires simple padding or complex padding.

2. The method of claim 1, wherein determining further comprises
counting object pixels that are adjacent to a non-object pixel for each column.

3. The method of claim 2, wherein determining further comprises comparing the count to a predetermined number.

4. The method of claim 3, wherein determining further comprises
identifying the block requiring complex padding if the count exceeds the predetermined number; and
identifying the block requiring simple padding if the count does not exceed the predetermined number.

5. The method of claim 3, wherein the predetermined number is 2.

6. A method comprising:
padding a block having rows and columns of pixels, by
transposing the rows and the columns of the block;
vertically padding the block;
subsequently transposing the rows and the columns of the block; and
subsequently vertically padding the block.

7. The method of claim 6, wherein vertically padding comprises
for each column, replacing a value of a non-object pixel with a padding value.

8. The method of claim 7, wherein the padding value is generated from at least one of the object pixels adjacent to a non-object pixel in the column.

9. A method comprising:
padding a block having rows and columns of pixels, by padding non-object pixels of the block using simultaneous logic operations.

10. The method of claim 9 further comprising:
determining whether the block requires simple padding or complex padding.

11. The method of claim 10 further comprising:
if the block requires simple padding, simultaneously padding the non-object pixels of each column by making vertical padding passes, wherein one is a top to bottom padding pass and another one is a bottom to top padding pass.

12. The method of claim 11, further comprising:
if the block requires complex padding, simultaneously padding the non-object pixels of each column by making a vertical padding pass, and marking the padded pixels on an averaging mask.

13. The method of claim 12 further comprising:
for each padded pixel on the averaging mask, determining an average value using the object border-pixel values for the corresponding column, and padding the pixel using the average value.

14. A computer readable medium having instructions, when executed in a processing system, cause the system to perform a method comprising:
testing a block having a plurality of pixels, including object pixels and non-object pixels, by
inserting a row of non-object pixels a vertical boundary of the block; and
determining whether the block requires simple padding or complex padding.

15. The computer readable medium of claim 14, wherein determining further comprises
counting object pixels that are adjacent to a non-object pixel for each column;
comparing the count to a predetermined number;
identifying the block requires simple padding if the count does not exceed the predetermined number; and
identifying the block requiring complex padding if the count exceeds the predetermined number.

16. A computer readable medium having instructions which, when executed by a processing system, cause the system to perform a method comprising padding a block having rows and columns of pixels, by
transposing the rows and the columns of the block;
vertically padding the block;
subsequently transposing the rows and the columns of the block; and
subsequently vertically padding the block.

17. The computer readable medium of claim 16, wherein vertically padding comprises:
for each column, replacing a value of a non-object pixel with a padding value.

18. A computer readable medium having instructions which, when executed by a processing system, cause the system to perform a method comprising padding a block having rows and columns of pixels, by
padding non-object pixels of the block using simultaneous logic operations.

19. The computer readable medium of claim 18 wherein the instructions, when executed, further cause the system to perform:

determining whether the block requires simple padding or complex padding;

if the block requires simple padding, simultaneously padding the non-object pixels of each column by replacing the value of the non-object pixels with the value of an object pixel that is adjacent to a non-object pixel in the column; and if the block requires complex padding, simultaneously padding the non-object pixels of each column by replacing the value of the non-object pixels with the average value of the object border-pixel values for the corresponding column.

20. An apparatus comprising:

means for testing a block having a plurality of pixels, including object pixels and non-object pixels, said means for testing having
means for inserting a row of non-object pixels on a vertical boundary of the block; and
means for determining whether the block requires simple padding or complex padding.

21. The apparatus of claim 20, wherein said means for determining further comprises means for counting object pixels that are adjacent to a non-object pixel for each column;

means for comparing the count to a predetermined number;

means for identifying the block requiring simple padding if the count does not exceed the predetermined number; and means for identifying the block requiring complex padding if the count exceeds the predetermined number.

22. An apparatus comprising:

means for padding a block having rows and columns of pixels, said means for padding having
means for transposing the rows and the columns of the block;
means for vertically padding the block;
means for subsequently transposing the rows and the columns of the block; and
means for subsequently vertically padding the block.

23. The apparatus of claim 22 wherein vertically padding comprises for each column, replacing a value of a non-object pixel with a padding value.

24. An apparatus comprising:

means for padding a block having rows and columns of pixels, said means for padding having
means for padding non-object pixels of the block using simultaneous logic operations.

25. The apparatus of claim 24, wherein said means for padding further comprises means for determining whether the block requires simple padding or complex padding;

means for simultaneously padding the non-object pixels of each column, if the block requiring simple padding, by replacing the value of the non-object pixels with the value of an object pixel that is adjacent to a non-object pixel in the column; and means for simultaneously padding the non-object pixels of each column, if the block requiring complex padding, by replacing the value of the non-object pixels with the average value of the object border-pixel values for the corresponding column.

26. A method comprising:

padding a block having rows and columns of pixels, by transposing the columns and rows of the block;
horizontally padding the block;
subsequently transposing the columns and rows of the block; and
subsequently horizontally padding the block.

27. The method of claim 26, wherein horizontally padding comprises:

for each row, replacing a value of a non-object pixel with a padding value.

28. The method of claim 9, further comprising:

simultaneously padding the non-object pixels of each column by making a vertical padding pass, and marking the padded pixels on an averaging mask; and for each padded pixel on the averaging mask, determining an average value using the object border-pixel values for the corresponding column, and padding the pixel using the average value.

29. The computer readable medium of claim 18 wherein the instructions, when executed, further cause the system to perform:

simultaneously padding the non-object pixels of each column by making a vertical padding pass, and marking the padded pixels on an averaging mask; and for each padded pixel on the averaging mask, determining an average value using the object border-pixel values for the corresponding column, and padding the pixel using the average value.

30. The apparatus of claim 24, wherein said means for padding further comprises:

simultaneously padding the non-object pixels of each column by making a vertical padding pass, and marking the padded pixels on an averaging mask; and for each padded pixel on the averaging mask, determining an average value using the object border-pixel values for the corresponding column, and padding the pixel using the average value.

* * * * *